(No Model.)
E. O. BARTLETT.
PROCESS OF MAKING SUBLIMED LEAD PIGMENTS.
No. 496,038. Patented Apr. 25, 1893.
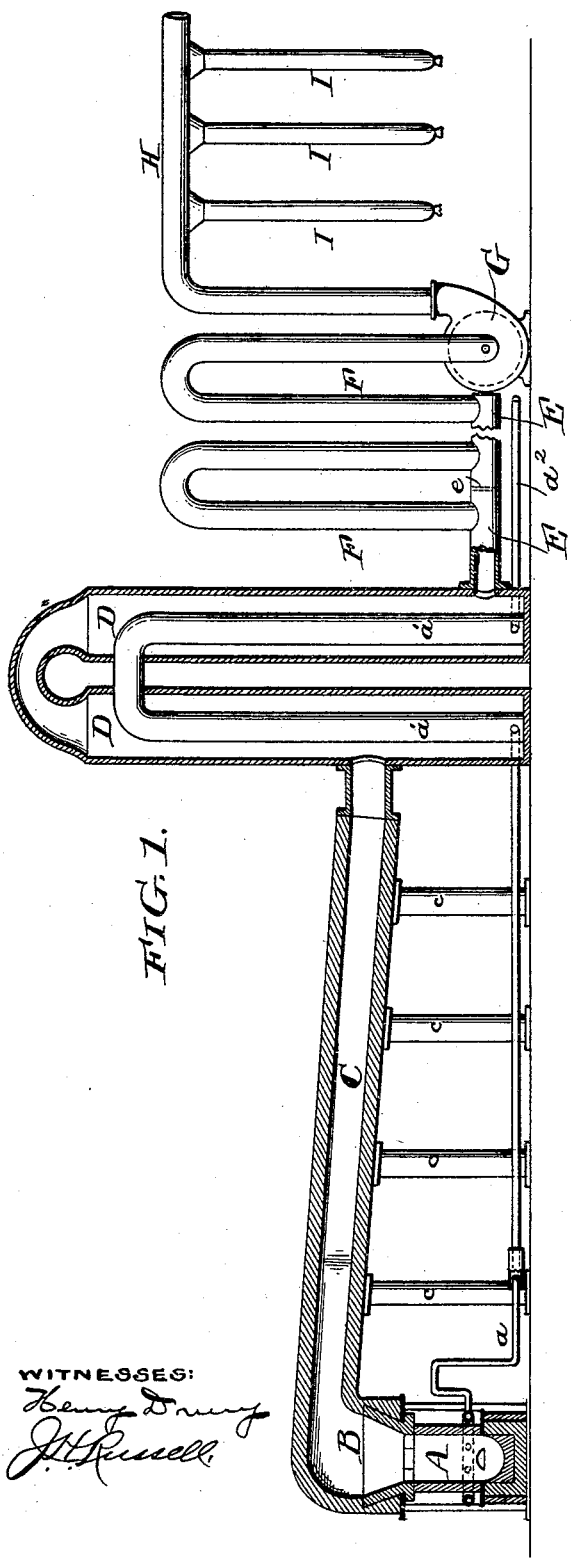
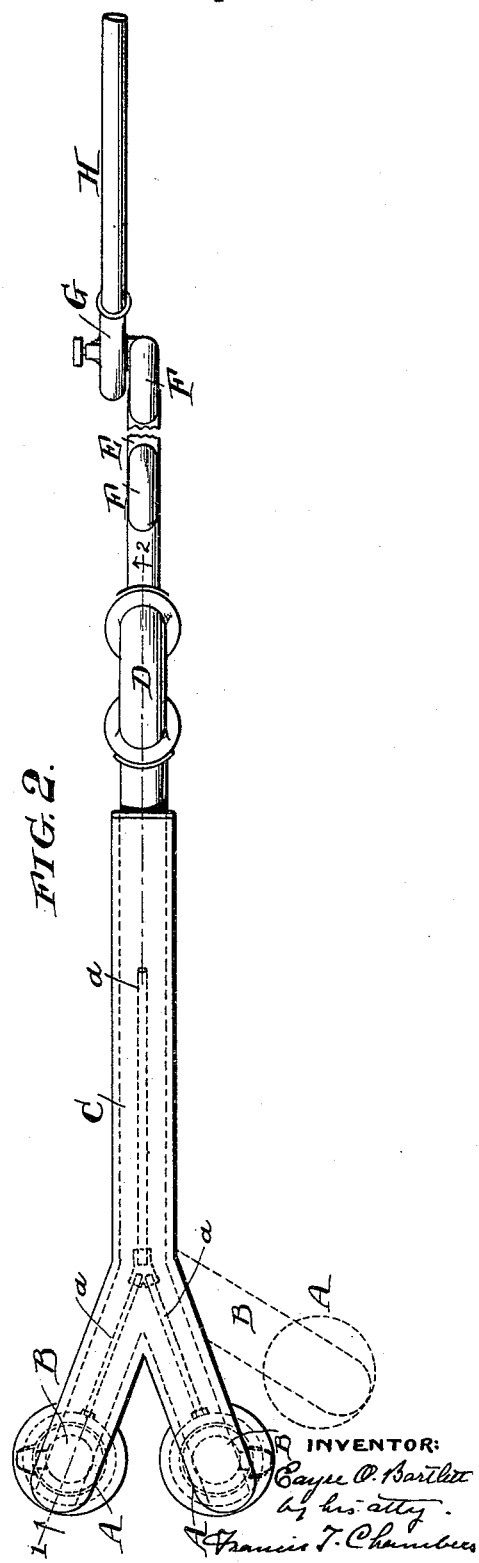
WITNESSES:
INVENTOR:
THE NORRIS PETERS CO., PHOTO-LITHO., WASHINGTON, D. C.

UNITED STATES PATENT OFFICE.

EAYRE O. BARTLETT, OF JOPLIN, MISSOURI.

PROCESS OF MAKING SUBLIMED-LEAD PIGMENTS.

SPECIFICATION forming part of Letters Patent No. 496,038, dated April 25, 1893.

Application filed June 13, 1892. Serial No. 436,474. (No specimens.)

*To all whom it may concern:*

Be it known that I, EAYRE O. BARTLETT, of Joplin, county of Jasper, State of Missouri, have invented a certain new and useful Improved Process of Making Sublimed-Lead Pigments, of which the following is a true and exact description, reference being had to the accompanying drawings, which form a part of this specification.

My invention relates to the process of making a white pigment from sublimed lead salts or fume driven off from smelting or other furnaces in which the ore is treated, and the object of my invention is to increase the value of the pigment produced both by a more thorough purification of the fume and by increasing its density. I have discovered that by subjecting the fumes as they come from the furnace in admixture with other products of combustion to a temperature sufficient to effect the partial melting of the fume the particles of carbon, ore, &c., which tend to discolor the pigment are more perfectly separated and the density of the unfused portion of the fume materially increased. In practice I have found that a flue of refractory material connected with the furnace or furnaces and maintained at a bright red heat for from twenty to thirty feet will, when the fumes are passed through it, effect the desired purification and the condensation of the fumes. And I have also ascertained that by combining two or more furnaces, preferably of the low cupola type with the fuel that the desired admixture can be secured and maintained in the flue without extraneous heat.

Reference is now had to the drawings which illustrate an apparatus suitable for use in carrying my process into effect, in which—

Figure 1 is a side elevation partly in section, and Fig. 2 a plan view.

A indicates a low cupola furnace of which there should be, for the best results, two or more connected with each flue. Thus in Fig. 2, two such furnaces are shown in full lines and a third in dotted lines.

B indicates the hood of the furnace; these hoods in each case communicating directly with the flue C made of a refractory material such as fire brick preferably inclined slightly downward and supported on columns as indicated at c. The flue C communicates with cooling devices; those shown consisting of a a goose-neck D through which pass air pipes $a'$, the goose-neck in turn communicating with a conduit E having cooling tubes F connected with it as indicated. A fan G communicates with this cooling apparatus and also with a conduit H with which are connected a series of fabric screens I I &c., of any satisfactory kind.

$a^2$ $a'$ $a$ indicate an air blast pipe leading to the tuyeres of the furnace as indicated.

In practice the ores or other lead bearing material are charged into the furnaces A and the products of combustion delivered into the refractory flue C which is maintained at a bright red heat. The effect of this admixture upon the fume is to fuse a portion of it, and this fusion has a purifying effect upon the remaining fume; the particles of matter which tend to discolor the pigment being very largely separated at this point. The unfused fume which escapes to the cooling device and thence to the screen is materially increased in density as well as in purity, and a considerable percentage, indeed, deposited in the flues or conduits before it reaches the screens owing to its increased density.

Having now described my invention, what I claim as new, and desire to secure by Letters Patent, is—

1. The process of manufacturing a sublimed lead pigment which consists in driving off fumes of lead from lead-bearing material in suitable furnaces, conducting the fume and products of combustion through flues connected with the furnaces and maintained at a bright red heat in order to effect the fusion of a part of the fume and to increase the purity and density of the unfused portion, and separating the purified fume from the gaseous products of combustion by screening.

2. The process of manufacturing a sublimed lead pigment which consists in maintaining a flue of refractory material at a bright red heat by conducting through it the products of combustion from two or more furnaces, driving off lead fume from material treated in all or a portion of said furnaces and conducting it with the products of combustion through said flue to effect a partial melting of said fume and increase the purity and density of said fume, and finally separating the purified fume from the gaseous products of combustion by screening.

EAYRE O. BARTLETT.

Witnesses:
B. V. SCHMUR,
A. E. SPENCER.